US012647468B2

(12) United States Patent
Cartwright et al.

(10) Patent No.: US 12,647,468 B2
(45) Date of Patent: Jun. 2, 2026

(54) MODULAR TECHNOLOGIES FOR SERVICING TELEPHONY SYSTEMS

(71) Applicant: CDW LLC, Vernon Hills, IL (US)

(72) Inventors: Nathan A. Cartwright, Cincinnati, OH (US); Christopher Deren, Itasca, IL (US); Darin C. Burleigh, Madison, WI (US); Michael A. Robinson, Clinton, OH (US); Matthew Toltzien, Fitchburg, WI (US); Andrew Kleinheinz, Middleton, WI (US)

(73) Assignee: CDW LLC, Vernon Hills, IL (US)

( * ) Notice: Subject to any disclaimer, the term of this patent is extended or adjusted under 35 U.S.C. 154(b) by 166 days.

(21) Appl. No.: 17/714,766

(22) Filed: Apr. 6, 2022

(65) Prior Publication Data

US 2023/0328121 A1    Oct. 12, 2023

(51) Int. Cl.
*H04L 65/1104* (2022.01)
*G10L 15/22* (2006.01)

(52) U.S. Cl.
CPC .......... *H04L 65/1104* (2022.05); *G10L 15/22* (2013.01); *G10L 2015/223* (2013.01)

(58) Field of Classification Search
CPC ................. H04L 65/1104; G10L 15/22; G10L 2015/223; H04M 3/42161; H04M 3/493; H04M 3/527; H04M 7/0096; H04M 3/323
See application file for complete search history.

(56) References Cited

U.S. PATENT DOCUMENTS

| | | | | |
|---|---|---|---|---|
| 5,978,463 | A * | 11/1999 | Jurkevics .............. | H04M 3/565 379/202.01 |
| 7,039,166 | B1 * | 5/2006 | Peterson ............... | H04M 3/493 379/93.08 |

(Continued)

FOREIGN PATENT DOCUMENTS

| | | |
|---|---|---|
| EP | 2506520 A1 | 10/2012 |

OTHER PUBLICATIONS

Yves, 3CX—Configuring a VoIP Provider/SIP Trunk, Published Date Aug. 21, 2018 https://3starsnet.zendesk.com/hc/en-us/articles/360008211234-3CX-Configuring-a-VoIP-Provider-SIP-Trunk (Year: 2018).*

(Continued)

*Primary Examiner* — Dhairya A Patel
*Assistant Examiner* — Vinh Nguyen
(74) *Attorney, Agent, or Firm* — MARSHALL, GERSTEIN & BORUN LLP

(57)         ABSTRACT
Modular technologies for servicing telephony systems are disclosed herein. An example method includes receiving a user request to service a telephony system of a user, and transmitting a set of available session initiation protocol (SIP) providers to a user computing device for analysis by the user. Responsive to receiving a user input, the example method includes connecting the user computing device to an SIP trunk, connecting to a serviceable call location included in the user request through the SIP trunk, wherein connecting to the serviceable call location initiates a data stream, and executing a servicing task included in the user request. The example method includes recording a portion of the data stream during execution of the servicing task, storing the portion of the data stream, and causing the user computing device to display the portion of the data stream for viewing by the user.

17 Claims, 6 Drawing Sheets

(56)          References Cited

U.S. PATENT DOCUMENTS

| | | | | |
|---|---|---|---|---|
| 7,420,963 B1* | 9/2008 | Shankar | H04L 12/66 | |
| | | | | 370/352 |
| 7,535,847 B1* | 5/2009 | Hansen | H04L 43/50 | |
| | | | | 370/400 |
| 8,077,849 B2* | 12/2011 | Altberg | H04L 65/1104 | |
| | | | | 379/201.01 |
| 8,467,354 B1* | 6/2013 | Jerkunica | H04L 61/4547 | |
| | | | | 370/352 |
| 8,787,363 B2* | 7/2014 | Dharanikota | H04Q 11/045 | |
| | | | | 379/22.03 |
| 9,003,049 B1* | 4/2015 | Simoes | H04L 65/1104 | |
| | | | | 709/230 |
| 9,100,503 B2* | 8/2015 | Terpstra | H04L 65/1046 | |
| 9,282,124 B2* | 3/2016 | Boerjesson | H04L 65/1045 | |
| 10,477,028 B1* | 11/2019 | Tobin | G06F 3/167 | |
| 10,484,648 B1* | 11/2019 | Sturges | H04M 15/58 | |
| 10,581,829 B1* | 3/2020 | Don | H04L 65/403 | |
| 10,755,269 B1* | 8/2020 | Mathis | G06Q 20/40 | |
| 10,791,221 B1* | 9/2020 | Vislocky | H04M 3/5116 | |
| 11,526,385 B1* | 12/2022 | Mannar | G06F 9/542 | |
| 2002/0167936 A1* | 11/2002 | Goodman | H04M 3/323 | |
| | | | | 370/352 |
| 2006/0126806 A1* | 6/2006 | Trandal | H04M 1/663 | |
| | | | | 379/88.26 |
| 2006/0159241 A1* | 7/2006 | Jagdish | H04M 3/493 | |
| | | | | 704/E15.044 |
| 2006/0187850 A1* | 8/2006 | Ward | H04L 65/80 | |
| | | | | 370/252 |
| 2006/0227766 A1* | 10/2006 | Mickle | H04L 65/1104 | |
| | | | | 370/356 |
| 2007/0015536 A1* | 1/2007 | LaBauve | H04W 88/06 | |
| | | | | 455/552.1 |
| 2007/0127670 A1* | 6/2007 | Morishima | H04L 51/04 | |
| | | | | 379/202.01 |
| 2007/0165821 A1* | 7/2007 | Altberg | H04L 65/1101 | |
| | | | | 379/210.02 |
| 2007/0265830 A1* | 11/2007 | Sidhu | H04L 65/1094 | |
| | | | | 704/9 |
| 2007/0265990 A1* | 11/2007 | Sidhu | G06Q 30/0284 | |
| | | | | 705/418 |
| 2007/0280210 A1* | 12/2007 | Milstein | H04L 12/185 | |
| | | | | 370/356 |
| 2007/0280211 A1* | 12/2007 | Malueg | H04L 65/1026 | |
| | | | | 370/356 |
| 2007/0280225 A1* | 12/2007 | Forbes | H04L 65/1069 | |
| | | | | 370/352 |
| 2007/0280254 A1* | 12/2007 | Milstein | H04L 65/401 | |
| | | | | 370/395.2 |
| 2007/0282989 A1* | 12/2007 | Milstein | H04M 7/006 | |
| | | | | 709/223 |
| 2007/0283142 A1* | 12/2007 | Milstein | H04L 63/08 | |
| | | | | 713/155 |
| 2007/0294336 A1* | 12/2007 | Pounds | H04M 1/72406 | |
| | | | | 709/203 |
| 2008/0003941 A1* | 1/2008 | Milstein | H04L 67/30 | |
| | | | | 455/3.01 |
| 2008/0037723 A1* | 2/2008 | Milstein | H04M 3/53375 | |
| | | | | 379/88.12 |
| 2008/0084870 A1* | 4/2008 | Taylor | H04W 4/02 | |
| | | | | 370/352 |
| 2008/0101339 A1* | 5/2008 | Forbes | H04L 12/66 | |
| | | | | 370/352 |
| 2008/0101552 A1* | 5/2008 | Khan | H04L 61/4535 | |
| | | | | 370/352 |
| 2008/0112551 A1* | 5/2008 | Forbes | H04M 3/436 | |
| | | | | 379/142.1 |
| 2008/0114594 A1* | 5/2008 | Forbes | G10L 15/22 | |
| | | | | 704/E15.04 |
| 2008/0144518 A1* | 6/2008 | Rosenwald | H04M 3/30 | |
| | | | | 370/250 |
| 2008/0146216 A1* | 6/2008 | Newman | H04L 43/50 | |
| | | | | 455/424 |
| 2008/0247382 A1* | 10/2008 | Verma | H04L 65/80 | |
| | | | | 370/352 |
| 2009/0060495 A1* | 3/2009 | Wurst | H04L 12/2861 | |
| | | | | 398/16 |
| 2009/0147926 A1* | 6/2009 | Fahrenthold | H04M 3/323 | |
| | | | | 379/1.01 |
| 2009/0161658 A1* | 6/2009 | Danner | H04L 12/66 | |
| | | | | 370/352 |
| 2009/0185665 A1* | 7/2009 | Chen | H04M 3/42153 | |
| | | | | 379/29.01 |
| 2009/0296907 A1* | 12/2009 | Vendrow | G06Q 10/06 | |
| | | | | 379/201.03 |
| 2010/0023603 A1* | 1/2010 | Archer | H04L 67/303 | |
| | | | | 709/225 |
| 2010/0046507 A1* | 2/2010 | Rosenberg | H04M 7/0078 | |
| | | | | 370/352 |
| 2010/0172246 A1* | 7/2010 | Adam | H04L 12/66 | |
| | | | | 370/242 |
| 2010/0210249 A1* | 8/2010 | Gisby | H04M 3/5158 | |
| | | | | 455/414.1 |
| 2012/0039448 A1* | 2/2012 | Poi | H04M 3/24 | |
| | | | | 379/26.01 |
| 2012/0063432 A1* | 3/2012 | Hurd | H04M 7/006 | |
| | | | | 370/352 |
| 2013/0121212 A1* | 5/2013 | Guha | H04W 4/029 | |
| | | | | 370/352 |
| 2013/0129068 A1* | 5/2013 | Lawson | H04M 3/51 | |
| | | | | 379/242 |
| 2013/0247151 A1* | 9/2013 | Barrett-Bowen | G06F 21/6245 | |
| | | | | 726/4 |
| 2013/0259028 A1* | 10/2013 | Skala | G06Q 30/06 | |
| | | | | 370/352 |
| 2013/0272513 A1* | 10/2013 | Phadnis | H04M 3/42042 | |
| | | | | 379/93.01 |
| 2014/0098945 A1* | 4/2014 | Terpstra | H04L 65/1026 | |
| | | | | 379/90.01 |
| 2014/0254435 A1* | 9/2014 | Menendez | H04L 65/1069 | |
| | | | | 370/259 |
| 2014/0254478 A1* | 9/2014 | Deshpande | H04L 45/22 | |
| | | | | 370/328 |
| 2014/0274086 A1* | 9/2014 | Boerjesson | H04L 65/1104 | |
| | | | | 455/450 |
| 2015/0087280 A1* | 3/2015 | Farrand | H04M 1/663 | |
| | | | | 455/415 |
| 2015/0163348 A1* | 6/2015 | Fisher, Jr. | H04M 3/2272 | |
| | | | | 455/423 |
| 2015/0195695 A1* | 7/2015 | Geiger | H04M 1/72454 | |
| | | | | 455/404.1 |
| 2015/0304829 A1* | 10/2015 | Zehavi | H04W 4/16 | |
| | | | | 370/219 |
| 2015/0319300 A1* | 11/2015 | Arbe | H04L 65/1104 | |
| | | | | 370/259 |
| 2016/0050317 A1* | 2/2016 | Natesan | H04M 3/493 | |
| | | | | 379/88.01 |
| 2016/0080428 A1* | 3/2016 | Fan | H04L 65/1069 | |
| | | | | 709/228 |
| 2016/0308915 A1* | 10/2016 | Balasaygun | H04L 65/1104 | |
| 2017/0212822 A1* | 7/2017 | Idrisov | G06F 9/5061 | |
| 2017/0220383 A1* | 8/2017 | Raj | G06F 9/505 | |
| 2017/0237860 A1* | 8/2017 | Mumick | H04M 3/53308 | |
| | | | | 455/417 |
| 2017/0331946 A1* | 11/2017 | Mumick | H04M 15/08 | |
| 2018/0095801 A1* | 4/2018 | George | G06F 16/252 | |
| 2018/0146090 A1* | 5/2018 | Lavian | H04M 3/493 | |
| 2018/0287926 A1* | 10/2018 | Williams | H04L 41/082 | |
| 2021/0248004 A1* | 8/2021 | Kim | G06F 9/4887 | |
| 2021/0289069 A1* | 9/2021 | Moshir | H04W 4/12 | |
| 2021/0314437 A1* | 10/2021 | Nixon | H04L 65/80 | |
| 2022/0027758 A1* | 1/2022 | Kreshpa | G06F 1/3206 | |
| 2022/0086198 A1* | 3/2022 | Cakulev | H04L 65/1063 | |
| 2022/0092583 A1* | 3/2022 | Ur | H04M 3/2281 | |
| 2022/0141332 A1* | 5/2022 | Mitchem | H04M 3/2227 | |
| | | | | 370/252 |
| 2022/0148568 A1* | 5/2022 | Kulkarni | G10L 15/22 | |
| 2022/0311866 A1* | 9/2022 | Klein | H04M 7/009 | |
| 2022/0350708 A1* | 11/2022 | Vishwakarma | G06F 11/1458 | |

(56) References Cited

U.S. PATENT DOCUMENTS

2023/0083081 A1 * 3/2023 Toscano ............. H04L 65/1106
379/100.15
2023/0176914 A1 * 6/2023 Kodama .............. G06F 9/5044
718/104
2023/0238119 A1 * 7/2023 Bleeker .................. G10L 15/22
705/2
2023/0291774 A1 * 9/2023 Kawakami ........... H04M 7/128

OTHER PUBLICATIONS

International Application No. PCT/US2023/017510, International
Search Report and Written Opinion, mailed Jul. 17, 2023.

* cited by examiner

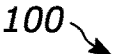

*100*

Central Hosting Server — *104*

*108* — Task Processor

*109* — Network Interface Controller

*110* — Memory

*111*

*112* — Front-End UI

*113* — Task Scheduler

*114* — Dashboard Interface Module

Serviceable Call Location Device — *106*

*106a* — Input Device

*106b* — Output Device

*106c* — Interactive Voice Response Platform

*106d* — Natural Language Processing Module

*106d1* — NLP Model

*120*

Network

SIP Provider — *118*

*118a* — Application Programming Interface

User Device — *102*

*102a* — Input Device

*102b* — Output Device

FIG. 1

Search: [        ]

| Start Date ⇕ | Next Run ⇕ | Action ⇕ |
|---|---|---|
| 2021-11-17T00:57:00.582Z | 2021-11-17T01:17:00.582Z | ✎ ▣ |
| 2021-11-18T14:16:30.983Z | 2021-11-18T14:36:30.983Z | ✎ ▣ |
| 2021-11-12T15:10:26.634Z | 2021-11-12T15:30:26.634Z | ✎ ▣ |
| 2022-01-12T15:19:10.287Z | 2022-01-12T15:39:10.287Z | ✎ ▣ |
| 2022-01-12T15:27:16.831Z | 2022-01-12T15:47:16.831Z | ✎ ▣ |
| 2021-11-16T19:44:21.411Z | 2021-11-16T20:04:21.411Z | ✎ ▣ |
| 2021-11-17T16:56:11.854Z | 2021-11-17T17:16:11.854Z | ✎ ▣ |
| 2021-11-18T14:11:27.277Z | 2021-11-18T14:31:27.277Z | ✎ ▣ |
| 2021-11-17T00:43:01.773Z | 2021-11-17T01:03:01.773Z | ✎ ▣ |

222e    222f    222g

Previous [1] Next

FIG. 2C (Continued)

MODULAR TECHNOLOGIES FOR SERVICING TELEPHONY SYSTEMS

FIELD OF THE DISCLOSURE

The present disclosure is generally directed to technologies for servicing telephony systems and, more particularly, to modular technologies for servicing telephony systems.

BACKGROUND

Today, many businesses rely on customer contact centers or otherwise automated call servicing systems to manage conversations between customers (e.g., patients) and customer representatives. In the modern economic environment, cost-effectively serving and retaining customers is of paramount importance, especially as customer retention is generally less expensive than new customer acquisition. Accordingly, the customer contact center or automated call servicing system is a cornerstone to a successful business strategy.

Customer contact centers handle a large amount of interaction between customers (e.g., patients) and companies, through customer representatives. As the cost of a live agent is substantial, many businesses have shifted towards interactive voice response (IVR) technology and, more recently, virtual agents that can help offload the live agent to a simple, straightforward task to improve the efficiency of the call center. Through IVR, the interaction with the customer may be classified into a series of steps, which are delivered to the customer in an automated manner, such as a pre-recorded script or multiple choice menus on a computer screen. Accordingly, certain information (e.g., the desired medical procedure or medical insurance account number, etc.) can be automatically obtained (e.g., via the telephone, a keypad, and/or a computer keyboard) before passing control to a live agent.

Virtual agents generally provide a greater set of customer interaction capabilities than IVR to more flexibly accommodate customer requests through a contact center without involving a live agent. More particularly, virtual agents may mimic live agents using scripted rules in conjunction with artificial intelligence (AI) (e.g., natural language processing (NLP) and conversational AI) to provide automated service over the phone or on a webpage. Further, virtual agents may utilize machine learning (ML) to learn from past interactions with customers to generally improve their customer service experience over time.

These conventional contact centers and otherwise automated call servicing systems can be complex, and generally require testing and regular servicing to ensure their correct operation. However, owners/operators of such conventional call servicing systems are typically hamstrung when testing and/or servicing is required because there is no efficient manner in which to accomplish the testing and/or servicing. Indeed, even routine maintenance activities, such as phone number verification, cannot be quickly and accurately performed using conventional methods. Such conventional testing/servicing techniques are exorbitantly priced, and allow only a minimal number of users access for testing/servicing at any one time, thereby resulting in significant processing bottlenecks and wait times for later users. As a result, conventional call servicing systems suffer from erratic performances, deleted and/or otherwise uncaptured call data, misdirected and/or otherwise mishandled incoming calls, and a plethora of other issues stemming from this lack of viable testing and servicing techniques.

Overall, conventional contact centers and automated call servicing systems provide, at best, limited, and in many instances, erroneous information corresponding to millions of users when not properly tested and regularly serviced. Correspondingly, a major point of emphasis in the telephony industry is accurately and efficiently performing contact center/automated call servicing system testing/servicing, as this poses a substantial challenge for traditional testing/servicing techniques. Accordingly, there is a need for modular technologies for servicing telephony systems that eliminate these processing bottlenecks, and allow individual users access to efficient, reliable testing and servicing of their respective contact center/automated call servicing system to thereby improve the overall quality of automated call service for customers, increase the efficiency of the underlying business as a result of fewer mishandled calls/call data, and to improve the overall customer experience and corresponding customer satisfaction.

SUMMARY

The embodiments described herein relate to, inter alia, modular technologies for servicing telephony systems. Specifically, the present techniques enable efficient and accurate training/servicing of a telephony system (also referenced herein as a "contact center" or an "automated call servicing system") by connecting a user with available session initiation protocol (SIP) providers, connecting the user computing device to an SIP trunk, and thereafter generating/executing servicing tasks to test/service/train the user's telephony system. The present techniques differ from traditional telephony system testing/servicing techniques at least in that they enable individual access to job creation and execution resources, such that the human resources (e.g., employees manually performing/re-performing testing/servicing tasks), processing resources, memory resources, and time required to perform such testing/servicing are greatly reduced relative to the conventional techniques.

Of course, it should be understood that the present techniques are applicable to any suitable industry, and that the embodiments described herein reference the healthcare industry (e.g., a pharmacy) only for the purposes of discussion. For example, the automotive industry, the information technology industry, and/or any other industry, business, or individual may utilize the present techniques to train, service, and/or otherwise test a telephony system.

In an embodiment, the present techniques include a method for servicing telephony systems. The method comprises: receiving, at a telephony system servicing application hosted on a central hosting server, a user request to service a telephony system of a user from a user computing device, wherein the user request includes a servicing task and a serviceable call location corresponding to the telephony system of the user; transmitting, by the telephony system servicing application, a set of available session initiation protocol (SIP) providers to the user computing device for analysis by the user; responsive to receiving a user input indicating a chosen SIP provider from the set of available SIP providers, connecting, by the telephony system servicing application, the user computing device to an SIP trunk provided by the chosen SIP provider; connecting, by the telephony system servicing application, to the serviceable call location included in the user request through the SIP trunk, wherein connecting to the serviceable call location initiates a data stream; executing, by a task processor stored on the central hosting server, the servicing task included in the user request; recording, by the task processor, a portion of the data stream during execution of the servicing task; storing, at the central hosting server, the portion of the data stream; and causing, by the telephony system servicing application, the user computing device to display the portion of the data stream for viewing by the user.

In another embodiment, the present techniques include a system for servicing telephony systems. The system comprises: one or more task processors; and one or more memories, storing instructions thereon that, when executed by the one or more task processors, cause the one or more task processors to: receive a user request to service a telephony system of a user from a user computing device, wherein the user request includes a servicing task and a serviceable call location corresponding to the telephony system of the user, transmit a set of available session initiation protocol (SIP) providers to the user computing device for analysis by the user, responsive to receiving a user input indicating a chosen SIP provider from the set of available SIP providers, connect the user computing device to an SIP trunk provided by the chosen SIP provider, connect to the serviceable call location included in the user request through the SIP trunk, wherein connecting to the serviceable call location initiates a data stream, execute the servicing task included in the user request, record a portion of the data stream during execution of the servicing task, store the portion of the data stream, and cause the user computing device to display the portion of the data stream for viewing by the user.

In yet another embodiment, the present techniques include a tangible machine-readable medium comprising instructions for servicing telephony systems that, when executed, cause a machine to at least: receive a user request to service a telephony system of a user from a user computing device, wherein the user request includes a servicing task and a serviceable call location corresponding to the telephony system of the user; transmit a set of available session initiation protocol (SIP) providers to the user computing device for analysis by the user; responsive to receiving a user input indicating a chosen SIP provider from the set of available SIP providers, connect the user computing device to an SIP trunk provided by the chosen SIP provider; connect to the serviceable call location included in the user request through the SIP trunk, wherein connecting to the serviceable call location initiates a data stream; execute the servicing task included in the user request; record a portion of the data stream during execution of the servicing task; store the portion of the data stream; and cause the user computing device to display the portion of the data stream for viewing by the user.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 1 depicts an example computing environment in which modular technologies for servicing telephony systems may be implemented, in accordance with embodiments described herein.

4

Figure 2A:
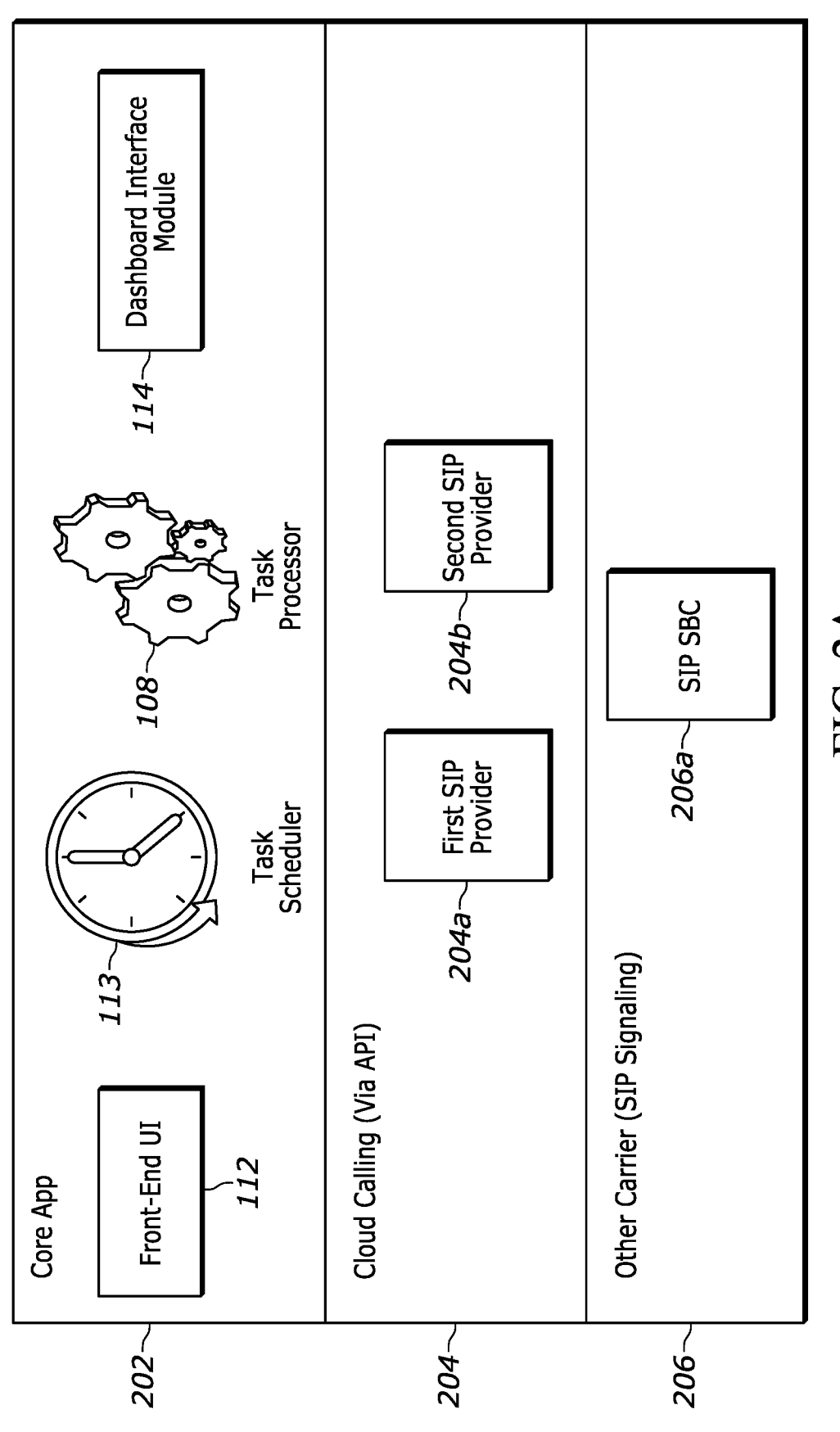

FIG. 2A depicts an example telephony servicing platform which may enable servicing of telephony systems in a modular fashion, in accordance with embodiments described herein.

Figure 2B:
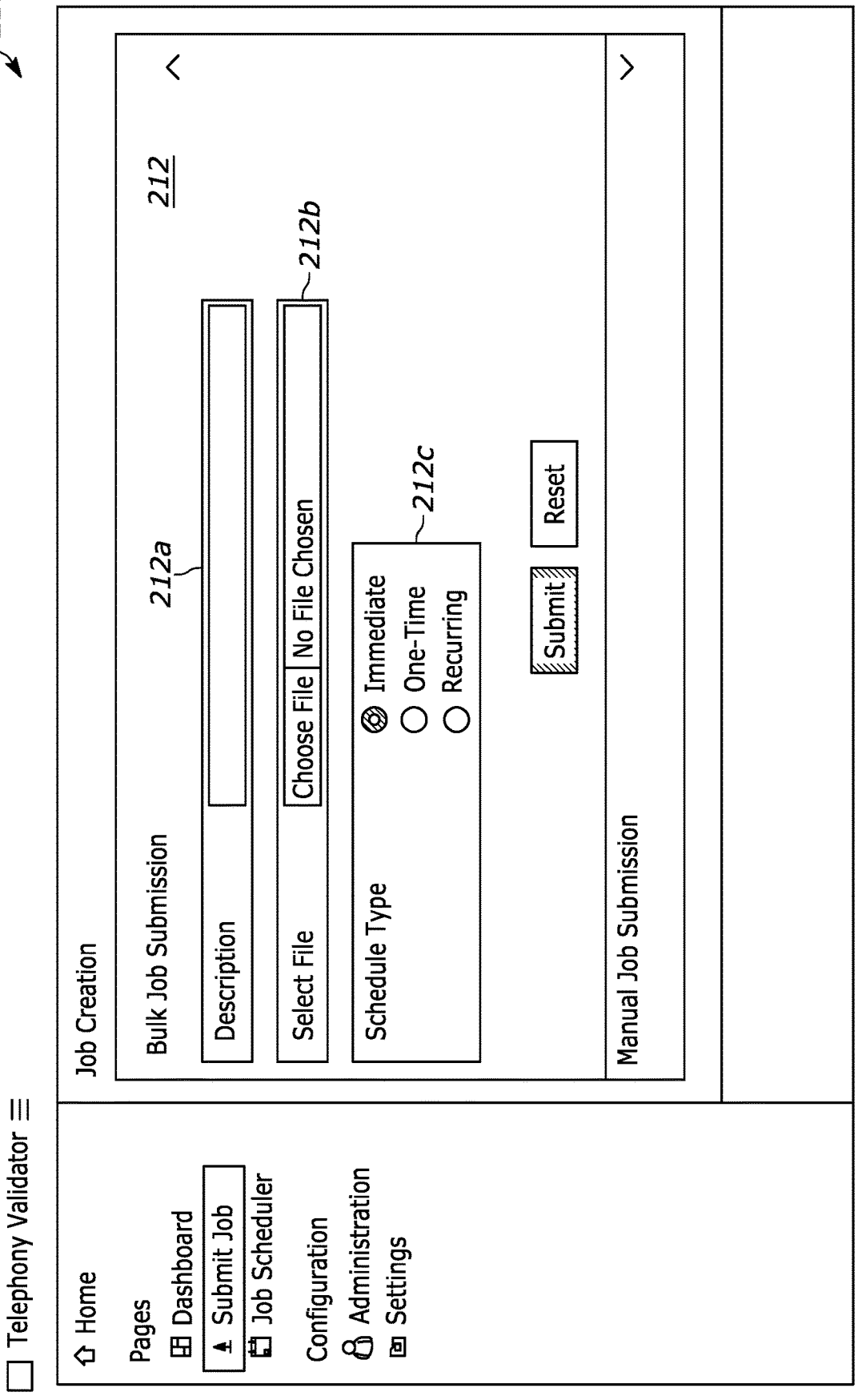

FIG. 2B is an example user interface (UI) that may be rendered as part of the execution of the core telephony servicing application module of FIG. 2A, in accordance with embodiments described herein.

Figure 2C:
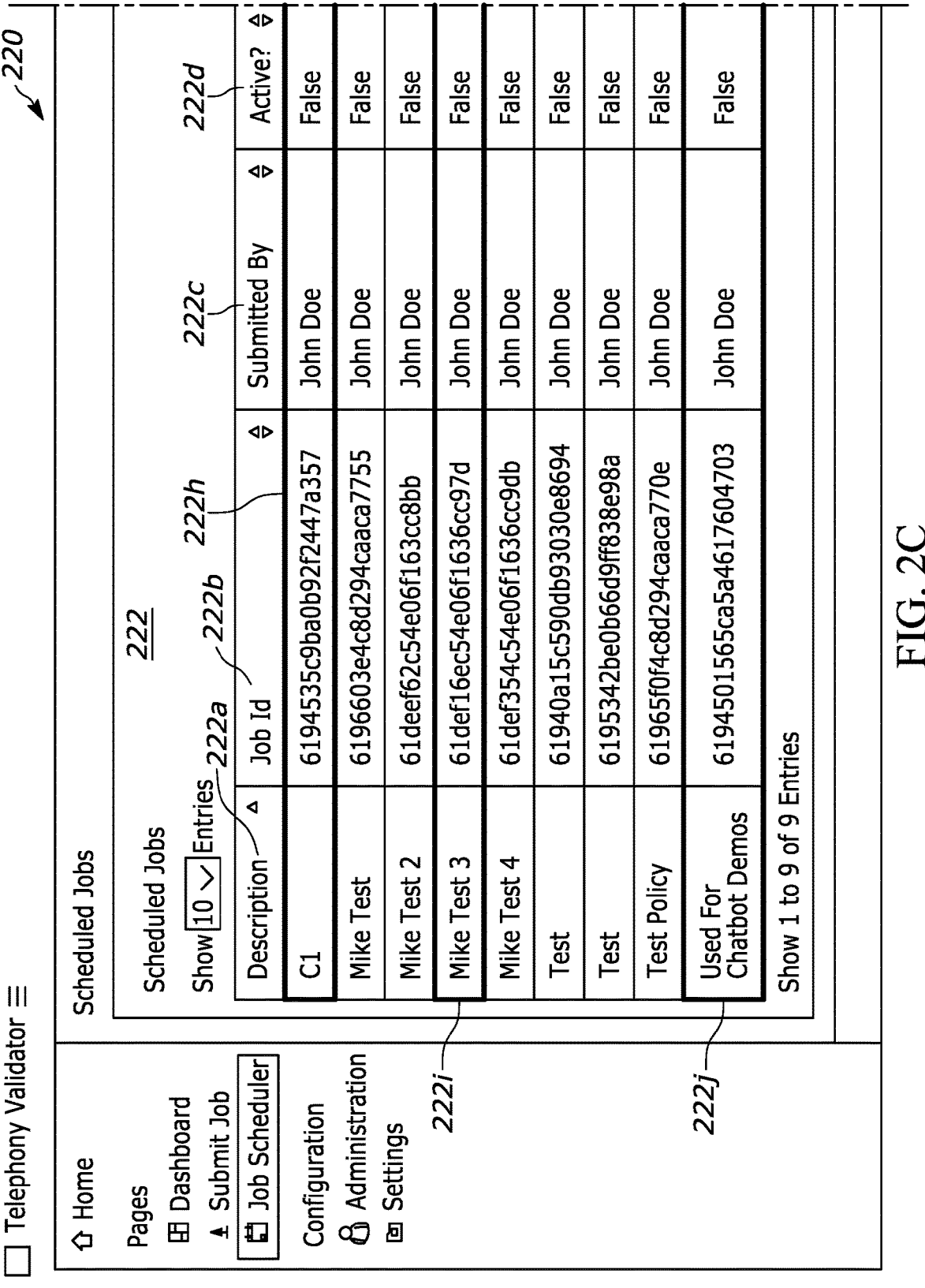

FIG. 2C is another example user interface (UI) that may be rendered as part of the execution of the core telephony servicing application module of FIG. 2A, in accordance with embodiments described herein.

Figure 3:
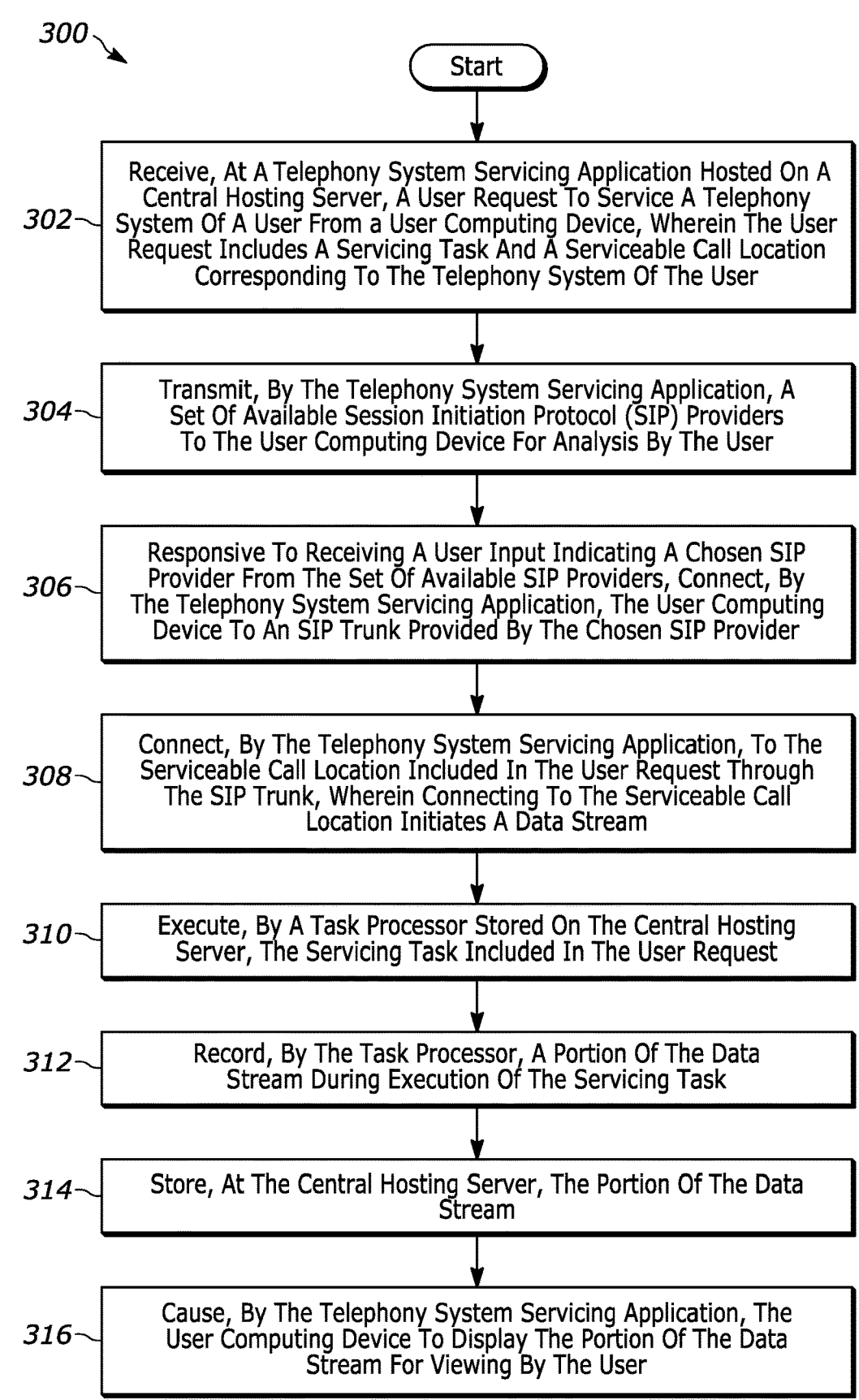

FIG. 3 is a flow diagram of an example method for servicing telephony systems, in accordance with embodiments described herein.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Example Computing Environment

FIG. 1 depicts an example computing environment 100 in which modular technologies for servicing telephony systems may be implemented, according to an embodiment. The environment 100 includes a user device 102, a central hosting server 104, a serviceable call location device 106, an SIP provider 118, and a network 120. Some embodiments may include a plurality of user devices 102, a plurality of serviceable call location devices 106, a plurality of central hosting servers 104, and/or a plurality of SIP providers 118.

Generally, the user device 102 may include an input device 102a and an output device 102b. The input device 102a may include any suitable device or devices for receiving input, such as one or more microphone, one or more camera, a hardware keyboard, a hardware mouse, a capacitive touch screen, etc. The output device 102b may include any suitable device for conveying output, such as a hardware speaker, a computer monitor, a touch screen, etc. In some cases, the input device 102a and the output device 102b may be integrated into a single device, such as a touch screen device that accepts user input and displays output.

The serviceable call location device 106 may include an input device 106a, an output device 106b, and in certain aspects, an interactive voice response (IVR) platform 106c. Generally speaking, the serviceable call location device 106 may be part of a user telephony system that includes one or more serviceable call location devices 106. For example, a user telephony system may correspond to a set of pharmacy locations that each have a respective serviceable call location device 106, and may each have a corresponding telephone number/contact information. In this example, a user utilizing the user device 102 to access the central hosting server 104 may be an owner of the set of pharmacy locations, and may desire to validate the phone numbers assigned and/or otherwise associated with each of the set of pharmacy locations. Accordingly, the user may utilize the user device 102 to access the central hosting server 104 (particularly the telephony system servicing application 111) in order to perform telephone number validation for each pharmacy location that includes a respective serviceable call location device 106.

In any event, the input device 106a may include any suitable device or devices for receiving input, such as one or more microphone, one or more camera, a hardware keyboard, a hardware mouse, a capacitive touch screen, etc. The output device 106b may include any suitable device for conveying output, such as a hardware speaker, a computer monitor, a touch screen, etc. In some cases, the input device 106a and the output device 106b may be integrated into a single device, such as a touch screen device that accepts user input and displays output. In certain aspects, the serviceable call location device 106 may be a healthcare service provider device, and/or any other suitable service provider that may interact with the user (e.g., via the user device 102) based on the task execution performed by executable instructions stored on the central hosting server 104.

The IVR platform 106c may comprise executable instructions that cause the serviceable call location device 106 to automatically respond to inputs received via the input device 106a using a pre-configured set of responses (referenced herein as a "script"). These inputs may be part of a data stream (e.g., telephone call) that includes vocal/audibly spoken words from a user (e.g., using the output device 102b), and/or the inputs may include data transmitted by the task processor 108 of the central hosting server 104 in response to instructions provided by a user utilizing the front-end UI 112 and the task scheduler 113. As referenced herein, a "task processor" may be any suitable processor(s), such as a microprocessor, digital signal processor (DSP), and/or any other suitable processor or combinations thereof that may be configured to execute instructions, as described herein.

For example, an input data stream to the serviceable call location device 106 may include a test telephone call originating from the user device 102 and/or the central hosting server 104 that is connected to the device 106 by the SIP provider 118, and the input data stream may include a set of pre-determined inputs configured to test an aspect of the IVR platform 106c. The set of pre-determined inputs may, for example, test whether or not the script of the IVR platform 106c executes properly, such that the correct responses are provided by the IVR platform 106c in response to each input. In another example, the input data stream may test whether or not the telephone number provided by a user corresponds to the correct owner of the telephone number (e.g., telephone number verification).

In certain aspects, the IVR platform 106c may include a natural language processing (NLP) module 106d. The NLP module 106d includes computer-executable instructions for training and operating an NLP model 106d1. In general, the NLP module 106d may train one or more NLP models 106d1 by establishing a network architecture, or topology, and adding layers that may be associated with one or more activation functions (e.g., a rectified linear unit, softmax, etc.), loss functions and/or optimization functions. Such training may generally be performed using a symbolic method, machine learning (ML) models, and/or any other suitable training method. More generally, the NLP module 106d may train the NLP models 106d1 to perform two techniques that enable the serviceable call location device 106, and/or any other suitable device to understand the words spoken by a user and/or words generated by a text to speech program executed by the task processor 108: syntactic analysis and semantic analysis.

Syntactic analysis generally involves analyzing text using basic grammar rules to identify overall sentence structure, how specific words within sentences are organized, and how the words within sentences are related to one another.

Syntactic analysis may include one or more sub-tasks, such as tokenization, part of speech (PoS) tagging, parsing, lemmatization and stemming, stop-word removal, and/or any other suitable sub-task or combinations thereof. For example, using syntactic analysis, the NLP model 106d1 may generate textual transcriptions from the verbal responses from the user and/or as generated by the central hosting server 104 as indicated in the user request, as part of the input data stream.

Semantic analysis generally involves analyzing text in order to understand and/or otherwise capture the meaning of the text. In particular, the NLP model 106d1 applying semantic analysis may study the meaning of each individual word contained in a textual transcription in a process known as lexical semantics. Using these individual meanings, the NLP model 106d1 may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the NLP model 106d1 may generate one or more intent interpretations based on the textual transcriptions from the syntactic analysis.

In these aspects, the IVR platform 106c may include an artificial intelligence (AI) trained conversational algorithm (e.g., the natural language processing (NLP) model 106d1) that is configured to interact with a user that is accessing the central hosting server 104 and connecting to the serviceable call location device 106 through the SIP provider 118. The user may be directly connected to the serviceable call location device 106 to provide verbal input/responses, and/or the user request may include textual inputs/responses that a text-to-speech algorithm (and/or other suitable algorithm) stored in memory 110 may convert to verbal inputs/responses for the NLP model 106d1 to interpret. When a user accesses the central hosting server 104 and connects to the serviceable call location device 106 through the SIP provider 118, the inputs/responses spoken by the user and/or generated by the text-to-speech algorithm (or other suitable algorithm) stored in memory 110 may be analyzed by the NLP model 106d1 to generate textual transcriptions and intent interpretations. The central hosting server 104 may receive the textual transcriptions and/or the intent interpretations from the NLP model 106d1 as part of the results displayed to the user at the user device 102 (e.g., through the output device 102b).

The NLP module 106d may train the one or more NLP models 106d1 to apply these and/or other NLP techniques using a plurality of verbal responses from a plurality of users. As a result, the NLP model 106d1 may be configured to output textual transcriptions and intent interpretations corresponding to the textual transcriptions based on the syntactic analysis and semantic analysis of the user's verbal responses as part of the input data stream.

In certain aspects, one or more types of machine learning (ML) may be employed to by the NLP module 106d to train the NLP model(s) 106d1. Further, in some aspects, the NLP model(s) 106d1 may be one or more types of ML models. For example, artificial neural networks, recurrent neural networks, deep learning neural networks, a Bayesian model, and/or any other suitable ML model may be used to train and/or otherwise implement the NLP model(s) 106d1. In these aspects, training may be performed by iteratively training the network using labeled training samples.

In instances where the NLP model(s) 106d1 is an artificial neural network, training of the NLP model(s) 106d1 may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction.

In embodiments, the one or more NLP models 106d1 may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

In any event, the serviceable call location device 106 may provide data in response to the input data stream that is stored and/or otherwise received at the central hosting server 104, through the connection provided by the SIP provider 118. In particular, the IVR platform 106c may provide responses to the inputs included as part of the input data stream in accordance with the configuration of the IVR script, and as such, may utilize touch-tone replacement, directed dialogue, and/or any other suitable IVR system. To illustrate, the SIP provider 118 may connect the user device 102 and/or the central hosting server 104 to the serviceable call location device 106, and the device 102 and/or the server 104 may initiate the input data stream and transmit input data to the device 106. The input data may include a series of textual/verbal inputs (e.g., keypad selections, specific verbal prompts) that are interpreted by the IVR platform 106c, and to which the IVR platform 106c may provide textual/verbal responses. Each of these textual/verbal responses provided by the IVR platform 106c may be recorded by the central hosting server 104, and may be utilized by the server 104 to cause the user device 102 to render and display an interface that includes the recorded portions of the data stream for viewing by the user.

As an example, a user may utilize the user device 102 to access the central hosting server 104, and create/schedule a IVR script verification job using the task scheduler 113, where the IVR platform 106 provides touch-tone replacement. The task processor 108 may then execute the IVR script verification job by connecting the user device 102 and/or the central hosting server 104 to the serviceable call location device 106 through the SIP provider 118 and providing simulated keypad selections (e.g., pressing "1", "2", etc. on a simulated telephone keypad) in response to the touch-tone replacement dialogue prompts provided by the IVR platform 106c. The IVR platform 106c may provide a series of pre-determined responses to each of the simulated keypad entries provided by the task processor 108, and ideally, the IVR platform 106c successfully returns the expected prompts in response to the simulated keypad entries that the task processor 108 provides to continue navigating through the script of the IVR platform 106c. Each of the responses provided by the IVR platform 106c as a result of the task processor 108 providing the simulated keypad selections may be recorded at the central hosting server 104 (e.g., in memory 110), and may be displayed to a user at the user device 102 (e.g., via output device 102b). In this manner, the user may view the results of the executed IVR script verification job, and may determine whether or not any revisions, modifications, and/or any type of adjustments should be made to the script of the IVR platform 106c.

The central hosting server 104 may be an individual server, a group (e.g., cluster) of multiple servers, or another suitable type of computing device or system (e.g., a collection of computing resources). In some embodiments, one or more components of the central hosting server 104 may be embodied by one or more virtual instances (e.g., a cloud-based virtualization service). In such cases, one or more central hosting server 104 may be included in a remote data center (e.g., a cloud computing environment, a public cloud, a private cloud, etc.).

However, regardless of the specific implementation of the central hosting server 104, a user may utilize the user device 102 to access the central hosting server 104 in order to access the user's specific account corresponding to the telephony system servicing application 111 that is stored in memory 110. In this manner, the telephony system servicing application 111 may operate on a Software-as-a-service (SaaS) delivery model, and may increase the number of users who have access to test/service their respective telephony systems at any one time compared to conventional systems. Moreover, as a result of the modular design and delivery model of the telephony system servicing application 111, users may also experience significantly fewer processing bottlenecks and wait times as compared to conventional systems, resulting in vastly improved user experiences.

Further, the central hosting server 104 includes a task processor 108 and a network interface controller (NIC) 109. The task processor 108 may include any suitable number of processors and/or processor types, such as CPUs and one or more graphics processing units (GPUs). Generally, the task processor 108 is configured to execute software instructions stored in memory 110, such as the telephony system servicing application 111. As previously mentioned, the task processor 108 may execute tasks scheduled by the task scheduler 113, and these tasks may generally include, for example, testing/validating whether or not an IVR script is executing normally, whether or not the IVR provides correct responses/dialogue flow, whether or not the IVR performs script execution with sufficient containment rates (e.g., frequency/rate of independently handling incoming call dia-logues without passing the call to a live agent), and/or any other suitable tasks or combinations thereof. In certain aspects, a single task may include a plurality of these and/or other exemplary tasks, such that the task processor 108 may test, for example, whether or not the an IVR script is executing normally while simultaneously determining whether or not the IVR performs script execution with sufficient containment rates.

The NIC 109 may include any suitable network interface controller(s), such as wired/wireless controllers (e.g., Eth-ernet controllers), and facilitate bidirectional/multiplexed networking over the network 120 between the central host-ing server 104 and other components of the environment 100 (e.g., user device 102, the SIP provider 118, the serviceable call location device 106, etc.).

In any event, the memory 110 may include one or more persistent memories (e.g., a hard drive/solid state memory) and stores one or more set of computer executable instruc-tions/modules, including a telephony system servicing appli-cation 111, a front-end user interface (UI) 112, a task scheduler 113, and a dashboard interface module 114.

Each of the modules stored in memory 110 implement specific functionality. In particular, each of the modules stored in memory 110 as part of the telephony system servicing application 111 may implement specific function-ality in order to provide modular service for user telephony systems. The front-end UI 112 may render and/or otherwise cause the user device 102 to render a UI that enables a user to access the task scheduler 113 and task processor 108, and to submit user requests that include servicing tasks and specify a serviceable call location (e.g., accessible through a serviceable call location device 106). As part of this access, the front-end UI 112 may also enable the user to create/modify specific servicing tasks and/or specify specific ser-viceable call locations where the specific servicing tasks may be executed by the task processor 108 at the time determined by the task scheduler 113.

The task scheduler 113 may create servicing jobs that include at least one servicing task, and may schedule ser-vicing tasks submitted as part of a user request for execution by the task processor 108. More generally, the task scheduler 113 may manage a servicing schedule that includes an ordered list of servicing tasks that the task processor 108 may execute in order. When a user utilizes the user device 102 (e.g., input device 102a) to submit a user request through the front-end UI 112, the task scheduler 113 may receive the servicing task included as part of the user request, create a servicing job that includes the servicing task, and may determine a suitable schedule (e.g., time) for the task processor 108 to execute the servicing task based on the servicing tasks/jobs already included on the servicing schedule.

For example, the user may submit a first user request from the user device 102 to the central hosting server 104 (e.g., via the front-end UI 112) containing a first servicing task for execution by the task processor 108. The task scheduler 113 may receive the first servicing task, create a first servicing job containing the first servicing task, and schedule the first servicing job for execution by the task processor 108 on the servicing schedule. The user may then submit a second user request from the user device 102 to the central hosting server 104 containing a second servicing task for execution by the task processor 108. The task scheduler 113 may receive the second servicing task, create a second servicing job con-taining the first servicing task, and schedule the second servicing job for execution by the task processor 108 behind/after the first servicing job on the servicing schedule.

Expanding on the prior example, the task processor 108 may generally check for new servicing tasks/jobs at a predetermined frequency, such that no particular servicing task/job may remain on the servicing schedule for an extended period of time. In some aspects, the task processor 108 may check the servicing schedule for newly scheduled tasks/jobs every minute in order to quickly accommodate user requests and execute desired servicing tasks/jobs. Of course, the frequency at which the task processor 108 checks the servicing schedule may be any suitable frequency (e.g., 1 second, 10 seconds, 30 seconds, 1 minute, 5 minutes, 10 minutes, etc.). In the prior example, the user may submit the first user request, and the task scheduler 113 may create the first servicing job, schedule the first servicing job, and the task processor 108 may execute the first servicing job before the user has the opportunity to submit the second user request. However, in the event that a user submits multiple user requests prior to the execution of a prior user request, or the user's initial request includes multiple servicing tasks, the task scheduler 113 may prioritize and/or otherwise schedule the servicing tasks/servicing jobs in a suitable execution order that enables the task processor 108 to successfully complete each requested servicing task.

The dashboard interface module 114 may generally receive results corresponding to the servicing tasks per-formed by the task processor 108 for display to a user at the user device 102. The task processor 108 may transmit the results of the executed servicing tasks to the memory 110 for storage, and the dashboard interface module 114 may there-after retrieve the stored results and generate graphs, tables, charts, and/or any other suitable display configuration to display the results corresponding to the servicing tasks on the output device 102b. For example, the dashboard inter-face module 114 may be or include an application (e.g., CHARTBREW) that is configured to process the results stored in memory 110 in order to automatically (or at a user's request) generate the various display options previ-ously mentioned for the user to review the results.

The SIP provider 118 may generally moderate commu-nications between the user device 102 and/or the central hosting server 104 and the serviceable call location device 106. When a user accesses the central hosting server 104, the task processor 108 may execute instructions to connect the user to the SIP provider 118. As a result, the task processor 108 may present the user with multiple SIP providers that may connect the user device 102 and/or the central hosting server 104 to the serviceable call location device 106. The user may select one SIP provider 118, and the SIP provider 118 may provide an SIP connection to the serviceable call location device 106. In certain aspects, the SIP provider 118 may provide this connection using an application program-ming interface (API) 118a, which may enable the SIP provider 118 to connect the user device 102 and/or the central hosting server 104 to the serviceable call location device 106 in instances where such an API 118a connection is required. In particular, the API 118a may enable trans-mission of certain data types between the user device 102 and/or the central hosting server 104 and the serviceable call location device 106.

The network 120 may be a single communication net-work, or may include multiple communication networks of one or more types (e.g., one or more wired and/or wireless local area networks (LANs), and/or one or more wired and/or wireless wide area networks (WANs) such as the Internet). The network 120 may enable bidirectional communication between the user device 102, the central hosting server 104, the SIP provider 118, and the serviceable call location device 106, or between multiple serviceable call location devices 106, for example.

Example Application and User Interfaces

FIG. 2A depicts an example telephony system servicing platform 200 which may enable servicing of telephony systems in a modular fashion, in accordance with embodiments described herein. Generally speaking, the example telephony system servicing platform 200 includes similar components from the example computing environment 100, particularly the telephony system servicing application 111 and the SIP provider 118, and indicates a general organization of these similar components to communicate with one another in order to provide modular telephony servicing. The example telephony system servicing platform 200 includes three broad telephony servicing modules that include a core telephony servicing application module 202, a cloud-based SIP provider module 204, and an alternative SIP provider module 206. Together, these telephony servicing modules 202, 204, 206 enable a user to receive efficient, convenient, and affordable access to servicing resources for the user's telephony system (e.g., including one or more serviceable call location devices 106).

The core telephony servicing application module 202 may generally include each of the components previously described with respect to the telephony servicing application 111 of FIG. 1, as well as the task processor 108. Namely, the core telephony servicing application module 202 may include the front-end UI 112, the task scheduler 113, the dashboard interface module 114, and the task processor 108. A user may access the core telephony servicing application module 202 by first logging into the front-end UI 112. Thereafter, the user may utilize the front-end UI 112 to upload user requests that include servicing tasks and serviceable call locations.

As an example, a user may log into the front-end UI 112 (e.g., using validated credentials), and may submit a user request that includes a single and/or multiple phone numbers which the user desires the task processor 108 to validate. In this example, the single and/or multiple phone numbers may correspond to the serviceable call location(s) designated as part of the user request, and the validation may correspond to the particular servicing task the task processor 108 is configured to execute by dialing and/or otherwise accessing the phone number(s). Additionally, or alternatively, the user may upload a user request that includes a range of phone numbers with which the task processor 108 is configured to execute a particular servicing task and/or multiple respective servicing tasks. Further, the user request may include multiple different servicing tasks for each phone number included as part of the user request, and the task processor 108 may proceed to execute the various different servicing tasks for the respective phone numbers. For example, a first phone number indicated in the user request may correspond to an owner verification servicing task, a second phone number in the user request may correspond to a script flow checking task, and a third phone number in the user request may correspond to a call routing validation task.

In any event, when the user logs into the front-end UI 112 and creates/submits a user request with a servicing task and serviceable call location specified, the core telephony servicing application module 202 may then present the user with a selection of SIP providers from which the user may choose to connect the task processor 108 to the serviceable call location device(s) (e.g., serviceable call location device 106). In certain aspects, the user may utilize a cloud-based architecture for an SIP provider, such that the module 202 may present the user with a selection from the cloud-based SIP provider module 204. In particular, the cloud-based SIP provider module 204 may include a first SIP provider 204a and a second SIP provider 204b, but it should be appreciated that the cloud-based SIP provider module 204 may provide a user with any suitable number of SIP providers for the user's selection.

However, in certain instances, a user may not desire and/or be able to utilize a cloud-based SIP service, and in these instances, the core telephony servicing application module 202 may present the user with a selection of other SIP carriers from the alternative SIP provider module 206. As an example, the alternative SIP provider module 206 may present a user with the ability to connect through an SIP session border controller (SBC) 206a. Generally, the SIP SBC 206a may provide a more traditional SIP trunk than the SIP providers 204a, 204b in the cloud-based SIP provider module 204 in order to allow the core telephony servicing application module 202 to connect and activate a data stream with a serviceable call location. However, regardless of the SIP provider chosen, the core telephony servicing application module 202 may then proceed to prepare the user request for execution by the task processor 108.

More specifically, the task scheduler 113 may receive the user request, including the servicing tasks and serviceable call locations, and may create a servicing job that is executable by the task processor 108. Generally, the servicing job may include instructions, that when executed by the task processor 108, cause the task processor 108 to perform the servicing task(s) corresponding to the serviceable call location(s). The servicing job may remain in memory (e.g., memory 110) until the task processor 108 executes the instructions included as part of the servicing job. For example, the servicing job may be added to the servicing schedule maintained by the task scheduler 113, and the task processor 108 may check the servicing schedule at a specified frequency in order to consistently execute any tasks included therein from a user. The task processor 108 may execute the scheduled servicing jobs at any suitable frequency, such as every 10 seconds, 30 seconds, 60 seconds, 5 minutes, and/or any other suitable frequency or combinations thereof. Moreover, in certain instances, a user may desire certain servicing tasks to be executed at a specified frequency, such that the user may confirm whether or not the telephony system is operating as intended. For example, a pharmacy chain may schedule frequent servicing tasks for each branch in order to confirm whether or not the telephony system is operating 24/7 in order to effectively service patient needs.

In any event, when the task processor 108 executes the instructions included as part of the servicing job, the task processor 108 may connect to a serviceable call location through the user-specified SIP provider (e.g., any of 204a, 204b, 206a). Generally, the SIP provider will enable the task processor 108 to connect to the serviceable call location in order to execute the servicing tasks included as part of the servicing job, and the SIP provider may capture/record all/part of the data stream in order to transmit results of the call back to the core telephony servicing application module 202. In particular, if the user selects a cloud-based SIP provider, such as the first SIP provider 204a or the second SIP provider 204b, the selected SIP provider may send SIP information for logging/reporting by the module 202 via an associated API (e.g., API 118a) in addition to sending the call results back to the module 202. To illustrate, the call results may include indications of the status of the call (e.g., calling, ringing, in progress, busy, failed), responses received to prompts, carriers/owners of the dialed number, a recorded beginning/entirety of a conversation, whether or not an IVR script was executed correctly, a containment rate of the call and/or multiple calls, that a message was left with a voicemail service at a particular serviceable call location, and/or any other suitable data corresponding to servicing tasks executed by the task processor 108 and combinations thereof.

When the task processor 108 has executed the instructions in the servicing job corresponding to the servicing tasks, the task processor 108 may return results of the call(s) to the memory (e.g., memory 110) and to the dashboard interface module 114. The dashboard interface module 114 may supply a dashboard and reporting interface that enables a user to review the results of the servicing tasks executed by the task processor 108. For example, when the task processor 108 has finished executing all servicing tasks included in a servicing job, the dashboard interface module 114 may cause a user device (e.g., user device 102) to render the dashboard and reporting interface that includes the results of each servicing task performed by the task processor 108. The user may review the results, and may proceed to submit a subsequent user request with additional servicing task(s) and serviceable call location(s), request that the task processor 108 re-execute a particular servicing task, and/or may simply exit the core telephony servicing application module 202.

To illustrate some of the interfaces a user may utilize in order to perform the telephony servicing described herein, FIG. 2B provides an example user interface (UI) 210 that may be rendered as part of the execution of the core telephony servicing application module 202 of FIG. 2A, in accordance with embodiments described herein. The example UI 210 includes a job submission section 212 in which a user may input/upload and/or otherwise indicate servicing tasks and/or serviceable call locations in order for a task scheduler (e.g., task scheduler 113) to create a servicing job. In particular, the job submission section 212 may include a description section 212*a*, a file select section 212*b*, and a scheduling section 212*c*. The description section 212*a* may enable a user to provide a description corresponding to the servicing tasks the user is providing for execution as part of the servicing job.

The file select section 212*b* may enable a user to browse memory (e.g., local memory of the user device 102 and/or memory 110) for stored servicing job files. As previously mentioned, the servicing job may include serviceable call locations, which in turn, may correspond to one or more phone numbers which the user desires that the application (e.g., core telephony servicing application module 202) services by executing the servicing tasks that are also included as part of the servicing job. Thus, a servicing job file stored in memory may include each of the phone numbers corresponding to the serviceable call locations, and the servicing job file may also include one or more servicing tasks corresponding to each of the phone numbers.

The scheduling section 212*c* may enable a user to specify a frequency at which the servicing job is executed by a task processor (e.g., task processor 108). As illustrated in FIG. 2B, a user may be presented with selectable options to execute the servicing job immediately, one-time, or as a recurring servicing job. The immediate option may enable the user to immediately schedule the servicing job for execution, such that the task processor 108 may execute the servicing job immediately when the task processor 108 checks for new servicing jobs (e.g., after 10 seconds, 30 seconds, 60 seconds, etc.). The one-time option may enable the user to schedule the servicing job for execution at a specified time. For example, the user may specify that the servicing job should be executed at a particular time/date, and the task scheduler 113 may place the servicing job in the servicing schedule at the corresponding time/date in order for the task processor 108 to execute the servicing job at the appropriate time/date. The recurring option may enable the user to schedule a servicing task for recurring execution by the task processor 108 at a scheduled date/time and/or at a user-specified frequency (e.g., every hour, every day, every week, every month, etc.).

When a user has completed the configuration and upload/input of a servicing job, using the example UI 210 of FIG. 2B, the application (e.g., core telephony servicing application module 202) may transition and/or otherwise render the example user interface (UI) 220 of FIG. 2C. Alternatively, the user may access the example UI 220 of FIG. 2C without uploading/inputting a servicing job through the example UI 210, as the user may desire to view the servicing schedule 222 without actively uploading/inputting a servicing job for execution. Regardless, the example UI 220 may be rendered as part of the execution of the example telephony servicing application 202 of FIG. 2A, and may generally enable a user to view the servicing schedule 222, as generated/maintained by the task scheduler 113.

The servicing schedule 222 includes multiple sections that each indicate one aspect of a particular servicing job for a user to review. Namely, the servicing schedule 222 includes a description section 222*a*, a servicing job ID section 222*b*, a submitting user section 222*c*, an active section 222*d*, a start date section 222*e*, a next run section 222*f*, and an action section 222*f*. The description section 222*a* may include any entered descriptions from the description section 212*a* of the example UI 210, and/or may include automatically generated descriptions corresponding to the servicing tasks, serviceable call locations, and/or any other information included in the servicing job file. The job ID section 222*b* may include a servicing job ID corresponding to the respective servicing job that the task scheduler 113 automatically generates as part of generating the servicing job. The submitting user section 222*c* may generally include a user ID, username, and/or any other credentials corresponding to the user who submitted the user request to the task scheduler 113. The active section 222*d* may indicate whether or not the respective servicing job is currently being executed by the task processor 108, whether or not the respective servicing job is being executed on a recurring schedule, and/or any other suitable indication. The start date section 222*e* may indicate when the respective servicing job was uploaded and/or when the respecting servicing job was first executed or most recently executed. The next run section 222*f* may indicate when the respective servicing job is next scheduled to be executed by the task processor 108. The action section 222*g* may generally indicate one or more actions that a user may take with respect to the servicing schedule 220. Moreover, the servicing schedule 220 may include several servicing jobs 222*h*, 222*i*, 222*j* that represent servicing jobs that have and/or will be executed by the task processor 108.

As a result of the architecture and functionality discussed above in reference to FIGS. 1-2C, the modular telephony servicing techniques discussed herein improve over conventional IVR and/or otherwise telephone management systems by allowing a user modular access to a testing platform (e.g., example telephony system servicing platform 200) to perform their individual servicing tasks associated with their telephony system. These techniques overcome the obstacles faced by conventional systems by providing a modular architecture to pair each individual customer/user with an SIP provider who can thereby enable the user to perform individual/customized testing of their specific telephony system. Therefore, the present techniques greatly increase the efficiency of testing, maintaining, and improving telephony systems due to the independent and immediate response of the modular system to a user's servicing queries/tasks submitted to the system, and correspondingly reduce the overall bottleneck demand on conventional processing resources and time by enabling users to perform their testing in a modular/distributed fashion.

Example Method

FIG. 3 is a flow diagram of an example method 300 for servicing telephony systems, in accordance with embodiments described herein. At least portions of the example method 300 may be performed by one or more processors (e.g., the task processor 108) utilizing the embodiments of the central hosting server 104, the serviceable call location device 106, the user device 102, the SIP provider 118, for example, and/or by other suitable modules or systems. In some aspects, the example method 300 may include additional or alternate steps other than those described herein.

The example method 300 includes receiving, at the telephony system servicing application hosted on a central hosting server (e.g., central hosting server 104), a user request to service a telephony system of a user from a user computing device (block 302). The user request may include a servicing task and a serviceable call location corresponding to the telephony system of the user. In some aspects, the servicing task includes (i) phone number verification, (ii) call routing verification, or (iii) interactive voice response (IVR) system functionality testing.

In certain aspects, the example method 300 may further include generating, by a task scheduler (e.g., task scheduler 113) stored on the central hosting server, an executable job to be executed by the task processor based on the user request. In these aspects, the executable job includes instructions that are executable by the task processor in order to connect to the serviceable call location and perform the servicing task. Thus, as previously mentioned, the task scheduler may receive the user request, including the servicing task(s) and the serviceable call location(s), and may generate a servicing job that includes executable instructions for the task processor in order to execute the servicing task(s) corresponding to the serviceable call location(s).

The example method 300 may further include transmitting, by a telephony system servicing application hosted on a central hosting server, a set of available session initiation protocol (SIP) providers to a user computing device for analysis by a user (block 304). For example, a user may access a front-end UI (e.g., front-end UI 112) of a servicing application (e.g., core telephony servicing application module 202) that is stored on a central hosting server (e.g., central hosting server 104) in order to service a telephony system owned/operated by the user. Upon the user's initial login and when the use interacts with the front-end UI, the servicing application may transmit the set of available SIP providers (e.g., SIP providers 204a, 204b, 206a) to the user through the front-end UI to enable the user to select an SIP provider in order to connect to a serviceable call location device and execute the user-specified servicing task(s).

In certain aspects, the telephony system of the user includes an interactive voice response (IVR) system that utilizes a trained natural language processing (NLP) algorithm. For example, and as previously mentioned, the NLP module 106d of the IVR platform 106c may train NLP models 106d1 to perform syntactic analysis and semantic analysis in order to understand the words spoken by a user and/or words generated by a text-to-speech program executed by the task processor 108. Additionally, or alternatively, one or more types of machine learning (ML) may be employed to by the NLP module 106d to train the NLP model(s) 106d1, and, in some aspects, the NLP model(s) 106d1 may be and/or include one or more types of ML models.

In some aspects, the telephony system servicing application (e.g., core telephony servicing application module 202) utilizes a Software as a service (SaaS) delivery model. In particular, the example telephony system servicing platform 200 may be configured such that each user who logs into the front-end UI 111 may be required to provide authenticating credentials, and may thereafter utilize the core telephony servicing application module 202 to independently build/execute servicing jobs.

In any event, responsive to receiving a user input indicating a chosen SIP provider from the set of available SIP providers, the example method 300 may include connecting, by the telephony system servicing application, the user computing device to an SIP trunk provided by the chosen SIP provider (block 306). Subsequently, the telephony system servicing application (e.g., by the chosen SIP provider) may connect to the serviceable call location included in the user request through the SIP trunk (block 308). Connecting to the serviceable call location may initiate a data stream for the application to transmit/receive data to/from the serviceable call location as part of executing the servicing tasks included in the user request.

The example method 300 may further include executing, by a task processor stored on the central hosting server, the servicing task included in the user request (block 310). In certain aspects, the telephony system of the user includes a plurality of serviceable call locations, and the user request includes a respective servicing task for each respective serviceable call location of the plurality of serviceable call locations. In these aspects, the example method 300 further includes (a) connecting, by the telephony system servicing application, to a respective serviceable call location of the plurality of serviceable call locations through the SIP trunk; (b) while connected to the respective serviceable call location, executing, by the task processor, the respective servicing task corresponding to the respective serviceable call location; and (c) iteratively performing (a)-(c) until the task processor determines that all respective servicing tasks included in the user request are complete.

In some aspects, the telephony system of the user includes a plurality of serviceable call locations, and the user request includes a respective servicing task for each respective serviceable call location of the plurality of serviceable call locations. In these aspects, the example method 300 further includes simultaneously connecting, by the telephony system servicing application, to each respective serviceable call location of the plurality of serviceable call locations through the SIP trunk. Simultaneously connecting to each respective serviceable call location may initiate a plurality of respective data streams. Further, the example method 300 may include, while simultaneously connected to each respective serviceable call location, executing, by the task processor, each respective servicing task for each respective serviceable call location. In these aspects, the example method 300 may further include, recording, by the task processor, a portion of each respective data stream of the plurality of respective data streams during execution of each respective servicing task.

As an example of the prior aspects, the telephony system of a user may include three serviceable call locations, and the user request may include a respective servicing task for each of the three serviceable call locations. In particular, the user request may include a phone number verification servicing task for the first serviceable call location, a call routing verification task for the second serviceable call location, and an IVR system functionality testing task for the third serviceable call location. The telephony system servicing application may simultaneously and/or sequentially connect to each of the serviceable call locations, and the task processor(s) may proceed to execute the respective servicing tasks for each of the serviceable call locations. Thus, the task processor may proceed to simultaneously and/or sequentially execute the phone number verification for the first serviceable call location, the call routing verification task for the second serviceable call location, and the IVR system functionality testing task for the third serviceable call location.

Continuing the prior example, as the task processor completes each of the servicing tasks, the telephony system servicing application may store data from each of the completed servicing tasks in memory (e.g., memory 110). For example, the telephony system servicing application may receive an indication from the task processor that the phone number verification task associated with the first serviceable call location was successful, and that the phone number is associated with the first serviceable call location. The telephony system servicing application may also receive an indication from the task processor that the call routing verification task associated with the second serviceable call location was successful, and that the call routing performed by the telephony system of the second serviceable call location correctly routed the call during the conversation managed by the task processor. Further, the telephony system servicing application may receive an indication from the task processor that the IVR system functionality testing task associated with the third serviceable call location was successful, and that the IVR system of the second serviceable call location correctly interpreted and responded to the inputs provided by the task processor.

The example method 300 may further include recording, by the task processor, a portion of the data stream during execution of the servicing task (block 312). Generally, the task processor may record data from the data stream by transmitting data from the data stream to a temporary storage location, where the data may be transferred to a permanent or otherwise longer-term storage location if the data is saved and/or otherwise indicated as important by a user. It should be understood that the task processor may transmit data to the central hosting server (e.g., memory 110) for storage in real-time during execution of the servicing task in order to record all/some of the data stream. As such, the memory of the central hosting server may act as the temporary storage location, until the data is reviewed by a user and selected for permanent/longer-term storage, transfer (e.g., to user device 102), deletion, and/or any other choice regarding data storage.

In any event, the example method 300 may also include storing, at the central hosting server, the portion of the data stream (block 314); and causing, by the telephony system servicing application, the user computing device to display the portion of the data stream for viewing by the user (block 316). In particular, the telephony system servicing application (e.g., the dashboard interface module 114) may display the recorded/stored data corresponding to the execution of the servicing task(s), and the user may review the recorded/stored data to determine whether or not to schedule additional servicing task(s), whether or not to permanently store/transfer the recorded/stored data, and/or any other suitable decision.

Aspects of the Disclosure

1. A method for servicing telephony systems, the method comprising: receiving, at a telephony system servicing application hosted on a central hosting server, a user request to service a telephony system of a user from a user computing device, wherein the user request includes a servicing task and a serviceable call location corresponding to the telephony system of the user; transmitting, by the telephony system servicing application, a set of available session initiation protocol (SIP) providers to the user computing device for analysis by the user; responsive to receiving a user input indicating a chosen SIP provider from the set of available SIP providers, connecting, by the telephony system servicing application, the user computing device to an SIP trunk provided by the chosen SIP provider; connecting, by the telephony system servicing application, to the serviceable call location included in the user request through the SIP trunk, wherein connecting to the serviceable call location initiates a data stream; executing, by a task processor stored on the central hosting server, the servicing task included in the user request; recording, by the task processor, a portion of the data stream during execution of the servicing task; storing, at the central hosting server, the portion of the data stream; and causing, by the telephony system servicing application, the user computing device to display the portion of the data stream for viewing by the user.

2. The method of aspect 1, wherein the telephony system of the user includes an interactive voice response (IVR) system that utilizes a trained natural language processing (NLP) algorithm.

3. The method of any of aspects 1-2, wherein the servicing task includes (i) phone number verification, (ii) call routing verification, or (iii) interactive voice response (IVR) system functionality testing.

4. The method of any of aspects 1-3, wherein the telephony system servicing application utilizes a Software as a service (SaaS) delivery model.

5. The method of any of aspects 1-4, wherein the telephony system of the user includes a plurality of serviceable call locations, the user request includes a respective servicing task for each respective serviceable call location of the plurality of serviceable call locations, and the method further comprises: (a) connecting, by the telephony system servicing application, to a respective serviceable call location of the plurality of serviceable call locations through the SIP trunk; (b) while connected to the respective serviceable call location, executing, by the task processor, the respective servicing task corresponding to the respective serviceable call location; and (c) iteratively performing (a)-(c) until the task processor determines that all respective servicing tasks included in the user request are complete.

6. The method of any of aspects 1-5, wherein the telephony system of the user includes a plurality of serviceable call locations, the user request includes a respective servicing task for each respective serviceable call location of the plurality of serviceable call locations, and the method further comprises: simultaneously connecting, by the telephony system servicing application, to each respective serviceable call location of the plurality of serviceable call locations through the SIP trunk, wherein simultaneously connecting to each respective serviceable call location initiates a plurality of respective data streams; while simultaneously connected to each respective serviceable call location, executing, by the task processor, each respective servicing task for each respective serviceable call location; and recording, by the task processor, a portion of each respective data stream of the plurality of respective data streams during execution of each respective servicing task.

7. The method of any of aspects 1-6, further comprising: generating, by a task scheduler stored on the central hosting server, an executable job to be executed by the task processor based on the user request, wherein the executable job includes instructions that are executable by the task processor in order to connect to the serviceable call location and perform the servicing task.

8. A system for servicing telephony systems, the system comprising: one or more task processors; and one or more memories, storing instructions thereon that, when executed by the one or more task processors, cause the one or more task processors to: receive a user request to service a telephony system of a user from a user computing device, wherein the user request includes a servicing task and a serviceable call location corresponding to the telephony system of the user, transmit a set of available session initiation protocol (SIP) providers to the user computing device for analysis by the user, responsive to receiving a user input indicating a chosen SIP provider from the set of available SIP providers, connect the user computing device to an SIP trunk provided by the chosen SIP provider, connect to the serviceable call location included in the user request through the SIP trunk, wherein connecting to the serviceable call location initiates a data stream, execute the servicing task included in the user request, record a portion of the data stream during execution of the servicing task, store the portion of the data stream, and cause the user computing device to display the portion of the data stream for viewing by the user.

9. The system of aspect 8, wherein the telephony system of the user includes an interactive voice response (IVR) system that utilizes a trained natural language processing (NLP) algorithm.

10. The system of any of aspects 8-9, wherein the servicing task includes (i) phone number verification, (ii) call routing verification, or (iii) interactive voice response (IVR) system functionality testing.

11. The system of any of aspects 8-10, wherein the one or more task processors and the one or more memories are included as part of a central hosting server that hosts a telephony system servicing application that utilizes a Software as a service (SaaS) delivery model.

12. The system of any of aspects 8-11, wherein the telephony system of the user includes a plurality of serviceable call locations, the user request includes a respective servicing task for each respective serviceable call location of the plurality of serviceable call locations, and the instructions, when executed by the one or more task processors, further cause the one or more task processors to: (a) connect to a respective serviceable call location of the plurality of serviceable call locations through the SIP trunk, (b) while connected to the respective serviceable call location, execute the respective servicing task corresponding to the respective serviceable call location, and (c) iteratively perform (a)-(c) until all respective servicing tasks included in the user request are complete.

13. The system of any of aspects 8-12, wherein the telephony system of the user includes a plurality of serviceable call locations, the user request includes a respective servicing task for each respective serviceable call location of the plurality of serviceable call locations, and the instructions, when executed by the one or more task processors, further cause the one or more task processors to: simultaneously connect to each respective serviceable call location of the plurality of serviceable call locations through the SIP trunk, wherein simultaneously connecting to each respective serviceable call location initiates a plurality of respective data streams, while simultaneously connected to each respective serviceable call location, execute each respective servicing task for each respective serviceable call location, and record a portion of each respective data stream of the plurality of respective data streams during execution of each respective servicing task.

14. The system of any of aspects 8-13, further comprising: a task scheduler configured to generate an executable job to be executed by the task processor based on the user request, wherein the executable job includes instructions that are executable by the task processor in order to connect to the serviceable call location and perform the servicing task.

15. A tangible machine-readable medium comprising instructions for servicing telephony systems that, when executed, cause a machine to at least: receive a user request to service a telephony system of a user from a user computing device, wherein the user request includes a servicing task and a serviceable call location corresponding to the telephony system of the user; transmit a set of available session initiation protocol (SIP) providers to the user computing device for analysis by the user; responsive to receiving a user input indicating a chosen SIP provider from the set of available SIP providers, connect the user computing device to an SIP trunk provided by the chosen SIP provider; connect to the serviceable call location included in the user request through the SIP trunk, wherein connecting to the serviceable call location initiates a data stream; execute the servicing task included in the user request; record a portion of the data stream during execution of the servicing task; store the portion of the data stream; and cause the user computing device to display the portion of the data stream for viewing by the user.

16. The tangible machine-readable medium of aspect 15, wherein the telephony system of the user includes an interactive voice response (IVR) system that utilizes a trained natural language processing (NLP) algorithm.

17. The tangible machine-readable medium of any of aspects 15-16, wherein the servicing task includes (i) phone number verification, (ii) call routing verification, or (iii) interactive voice response (IVR) system functionality testing.

18. The tangible machine-readable medium of any of aspects 15-17, wherein the telephony system of the user includes a plurality of serviceable call locations, the user request includes a respective servicing task for each respective serviceable call location of the plurality of serviceable call locations, and the instructions, when executed, further cause the machine to at least: (a) connect to a respective serviceable call location of the plurality of serviceable call locations through the SIP trunk; (b) while connected to the respective serviceable call location, execute the respective servicing task corresponding to the respective serviceable call location; and (c) iteratively perform (a)-(c) until all respective servicing tasks included in the user request are complete.

19. The tangible machine-readable medium of any of aspects 15-18, wherein the telephony system of the user includes a plurality of serviceable call locations, the user request includes a respective servicing task for each respective serviceable call location of the plurality of serviceable call locations, and the instructions, when executed, further cause the machine to at least: simultaneously connect to each respective serviceable call location of the plurality of serviceable call locations through the SIP trunk, wherein simultaneously connecting to each respective serviceable call location initiates a plurality of respective data streams; while simultaneously connected to each respective serviceable call location, execute each respective servicing task for each respective serviceable call location; and record a portion of each respective data stream of the plurality of respective data streams during execution of each respective servicing task.

20. The tangible machine-readable medium of any of aspects 15-19, wherein the instructions, when executed, further cause the machine to at least: generate an executable job based on the user request, wherein the executable job includes instructions that are executable by the machine in order to connect to the serviceable call location and perform the servicing task.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for servicing telephony systems, the method comprising:

receiving, at a telephony system servicing application hosted on a central hosting server, a user request to service a telephony system of a user from a user computing device, wherein the user request includes one or more servicing tasks for a plurality of serviceable call locations corresponding to the telephony system of the user;

transmitting, by the telephony system servicing application, a set of available session initiation protocol (SIP) providers to the user computing device for analysis by the user;

responsive to receiving a user input indicating a chosen SIP provider from the set of available SIP providers, connecting, by the telephony system servicing application, the user computing device to an SIP trunk provided by the chosen SIP provider;

simultaneously connecting, by the telephony system servicing application, to two or more serviceable call locations included in the user request through the SIP trunk, wherein connecting to the two or more serviceable call locations initiates a data stream for each serviceable call location of the two or more serviceable call locations;

executing, by a task processor stored on the central hosting server, at least one servicing task of the one or more servicing tasks included in the user request;

recording, by the task processor, a portion of the data stream during execution of the at least one servicing task;

generating, by a task scheduler stored on the central hosting server, an executable job to be executed by the task processor based on the user request, wherein the executable job includes instructions that are executable by the task processor in order to connect to the two or more serviceable call locations and perform the at least one servicing task, wherein at least one executable job is scheduled to occur at a specified frequency;

storing, at the central hosting server, the portion of the data stream; and causing, by the telephony system servicing application, the user computing device to display the portion of the data stream for viewing by the user.

2. The method of claim 1, further comprising:

executing, by the task processor, the one or more servicing tasks included in the user request by interacting with an interactive voice response (IVR) system utilizing a trained natural language processing (NLP) algorithm that is included as part of the telephony system of the user.

3. The method of claim 1, further comprising:

executing, by the task processor, the one or more servicing tasks included in the user request, wherein each servicing task includes (i) phone number verification, (ii) call routing verification, or (iii) interactive voice response (IVR) system functionality testing.

4. The method of claim 1, further comprising:

receiving, at the telephony system servicing application, the user request to service the telephony system of the user from the user computing device, wherein the user request includes the one or more servicing tasks and the plurality of serviceable call locations corresponding to the telephony system of the user, and wherein the telephony system servicing application utilizes a Software as a service (SaaS) delivery model.

5. The method of claim 1, further comprising:

(a) connecting, by the telephony system servicing application, to a respective serviceable call location of the plurality of serviceable call locations included in the telephony system of the user through the SIP trunk;

(b) while connected to the respective serviceable call location, executing, by the task processor, a respective servicing task corresponding to the respective serviceable call location; and (c) iteratively performing (a)-(b) until the task processor determines that all respective servicing tasks included in the user request are complete.

6. The method of claim 1, further comprising:

simultaneously connecting, by the telephony system servicing application, to each respective serviceable call location of the plurality of serviceable call locations included in the telephony system of the user through the SIP trunk, wherein simultaneously connecting to each respective serviceable call location initiates a plurality of respective data streams;

while simultaneously connected to each respective serviceable call location, executing, by the task processor, each respective servicing task for each respective serviceable call location; and recording, by the task processor, a portion of each respective data stream of the plurality of respective data streams during execution of each respective servicing task.

7. A system for servicing telephony systems, the system comprising:

one or more task processors; and one or more memories, storing instructions thereon that, when executed by the one or more task processors, cause the one or more task processors to:

receive a user request to service a telephony system of a user from a user computing device, wherein the user request includes one or more servicing tasks for a plurality of serviceable call locations corresponding to the telephony system of the user, transmit a set of available session initiation protocol (SIP) providers to the user computing device for analysis by the user, responsive to receiving a user input indicating a chosen SIP provider from the set of available SIP providers, connect the user computing device to an SIP trunk provided by the chosen SIP provider, simultaneously connect to two or more serviceable call locations included in the user request through the SIP trunk, wherein connecting to the two or more serviceable call locations initiates a data stream for each serviceable call location of the two or more serviceable call locations, execute at least one servicing task of the one or more servicing tasks included in the user request, record a portion of the data stream during execution of the at least one servicing task, generate, by a task scheduler stored on the central hosting server, an executable job to be executed by the task processor based on the user request, wherein the executable job includes instructions that are executable by the task processor in order to connect to the two or more serviceable call locations and perform the at least one servicing task, wherein at least one executable job is scheduled to occur at a specified frequency;

store the portion of the data stream, and cause the user computing device to display the portion of the data stream for viewing by the user.

8. The system of claim 7, wherein the telephony system of the user includes an interactive voice response (IVR) system that utilizes a trained natural language processing (NLP) algorithm.

9. The system of claim 7, wherein the one or more servicing tasks each include (i) phone number verification, (ii) call routing verification, or (iii) interactive voice response (IVR) system functionality testing.

10. The system of claim 7, wherein the one or more task processors and the one or more memories are included as part of a central hosting server that hosts a telephony system servicing application that utilizes a Software as a service (SaaS) delivery model.

11. The system of claim 7, wherein the telephony system of the user includes a plurality of serviceable call locations, the user request includes a respective servicing task for each respective serviceable call location of the plurality of serviceable call locations, and the instructions, when executed by the one or more task processors, further cause the one or more task processors to:

(a) connect to a respective serviceable call location of the plurality of serviceable call locations through the SIP trunk, (b) while connected to the respective serviceable call location, executing, by the task processor, a respective servicing task corresponding to the respective serviceable call location; and (c) iteratively perform (a)-(b) until all respective servicing tasks included in the user request are complete.

12. The system of claim 7, wherein the telephony system of the user includes a plurality of serviceable call locations, and the instructions, when executed by the one or more task processors, further cause the one or more task processors to:

simultaneously connect to each respective serviceable call location of the plurality of serviceable call locations through the SIP trunk, wherein simultaneously connecting to each respective serviceable call location initiates a plurality of respective data streams, while simultaneously connected to each respective serviceable call location, execute each respective servicing task for each respective serviceable call location, and record a portion of each respective data stream of the plurality of respective data streams during execution of each respective servicing task.

13. A tangible non-transitory machine-readable medium comprising instructions for servicing telephony systems that, when executed, cause a machine to at least:

receive a user request to service a telephony system of a user from a user computing device, wherein the user request includes one or more servicing tasks for a plurality of serviceable call locations corresponding to the telephony system of the user;

transmit a set of available session initiation protocol (SIP) providers to the user computing device for analysis by the user;

responsive to receiving a user input indicating a chosen SIP provider from the set of available SIP providers, connect the user computing device to an SIP trunk provided by the chosen SIP provider;

simultaneously connect to two or more serviceable call locations included in the user request through the SIP trunk, wherein connecting to the two or more serviceable call locations initiates a data stream for each serviceable call location of the two or more serviceable call locations;

execute at least one servicing task of the one or more servicing tasks included in the user request;

record a portion of the data stream during execution of the at least one servicing task;

generate, by a task scheduler stored on the central hosting server, an executable job to be executed by the task processor based on the user request, wherein the executable job includes instructions that are executable by the task processor in order to connect to the two or more serviceable call locations and perform the at least one servicing task, wherein at least one executable job is scheduled to occur at a specified frequency;

store the portion of the data stream; and cause the user computing device to display the portion of the data stream for viewing by the user.

14. The tangible non-transitory machine-readable medium of claim 13, wherein the telephony system of the user includes an interactive voice response (IVR) system that utilizes a trained natural language processing (NLP) algorithm.

15. The tangible non-transitory machine-readable medium of claim 13, wherein the one or more servicing tasks each include (i) phone number verification, (ii) call routing verification, or (iii) interactive voice response (IVR) system functionality testing.

16. The tangible non-transitory machine-readable medium of claim 13, wherein the telephony system of the user includes a plurality of serviceable call locations, the user request includes a respective servicing task for each respective serviceable call location of the plurality of serviceable call locations, and the instructions, when executed, further cause the machine to at least:

(a) connect to a respective serviceable call location of the plurality of serviceable call locations through the SIP trunk;

(b) while connected to the respective serviceable call location, execute a respective servicing task corresponding to the respective serviceable call location; and (c) iteratively perform (a)-(b) until all respective servicing tasks included in the user request are complete.

17. The tangible non-transitory machine-readable medium of claim 13, wherein the instructions, when executed, further cause the machine to at least:

simultaneously connect to each respective serviceable call location of the plurality of serviceable call locations through the SIP trunk, wherein simultaneously connecting to each respective serviceable call location initiates a plurality of respective data streams;

while simultaneously connected to each respective serviceable call location, execute each respective servicing task for each respective serviceable call location; and record a portion of each respective data stream of the plurality of respective data streams during execution of each respective servicing task.

* * * * *